United States Patent [19]

Mochizuki et al.

[11] Patent Number: 4,512,641

[45] Date of Patent: Apr. 23, 1985

[54] COMPOUND EYE PROJECTION DEVICE

[75] Inventors: Noritaka Mochizuki, Yokohama; Setsuo Minami, Kawasaki; Yoshiya Matsui, Yokohama all of Japan

[73] Assignee: Canon Kabushiki Kaisha, Tokyo, Japan

[21] Appl. No.: 359,482

[22] Filed: Mar. 18, 1982

[30] Foreign Application Priority Data

Mar. 31, 1981 [JP] Japan ................................ 56-47621

[51] Int. Cl.³ ..................... G02B 27/00; G02B 27/40
[52] U.S. Cl. .................................. 350/573; 350/167
[58] Field of Search ............... 350/502, 512, 572–573, 350/451, 479, 167; 355/46, 50

[56] References Cited

U.S. PATENT DOCUMENTS

| | | | |
|---|---|---|---|
| 3,605,593 | 9/1971 | Anderson | 355/46 |
| 4,168,900 | 9/1979 | Adachi | 350/573 |
| 4,275,962 | 6/1981 | Midorikawa et al. | 355/50 |
| 4,316,665 | 2/1982 | Mochizuki et al. | 355/50 |
| 4,368,975 | 1/1983 | Matsui et al. | 355/46 |
| 4,402,572 | 9/1983 | Tsunoda et al. | 350/167 |
| 4,426,132 | 1/1984 | Tsunoda et al. | 350/167 |
| 4,431,299 | 2/1984 | Matsui et al. | 355/8 |

*Primary Examiner*—William H. Punter
*Attorney, Agent, or Firm*—Fitzpatrick, Cella, Harper & Scinto

[57] ABSTRACT

A compound eye projection device includes a first lens and a second lens equal in shape and power. These two lenses are disposed with their optical axis being coincident with each other and together constitute an element lens system. A plurality of such element lens systems are arranged in a line form in a predetermined direction to thereby form a projection device.

3 Claims, 7 Drawing Figures

COMPOUND EYE PROJECTION DEVICE

BACKGROUND OF THE INVENTION

1. Field of the Invention

This invention relates to a compound eye projection device of an erect one-to-one magnification system having a short distance between the object point and the image point which is used for slit exposure or the like. More particularly, it relates to a device for uniformizing the illumination on the image plane in the line direction in which element lens systems are arranged in a predetermined direction.

2. Description of the Prior Art

It is known that, as described in U.S. Pat. No. 3,592,542 (German Pat. No. 1,203,115), by using a so-called compound eye optical system in which a plurality of element lens systems for projecting an image element or a partial area of an object onto a predetermined partial area on the image plane are arranged in a predetermined direction in a plane perpendicular to the optical axis, for example, lengthwise of the slit in a slit exposure type copying apparatus or the like, the distance from the object surface to the image plane is shortened and the entire device is made compact thereby.

SUMMARY OF THE INVENTION

The present invention has, for its object, to provide improvements in such a compound eye projection device and to provide a compound eye projection device in which the illumination distribution on the image plane is uniformized on arranged lines.

In the compound eye projection device according to the present invention, a first lens and a second lens equal in shape and power are disposed with their optical axes coincident with each other and these two lenses together constitute an element lens system, a plurality of such element lens systems being arranged in a line in a predetermined direction to thereby form a projection device. The above object is achieved by maintaining the later described predetermined relations between the shapes of the lenses forming the element lens systems, between the first lens and the second lens, and between adjacent element lenses.

The invention will become more fully apparent from the following detailed description thereof taken in conjunction with the accompanying drawings.

DESCRIPTION OF THE PREFERRED EMBODIMENT

Figure 1:
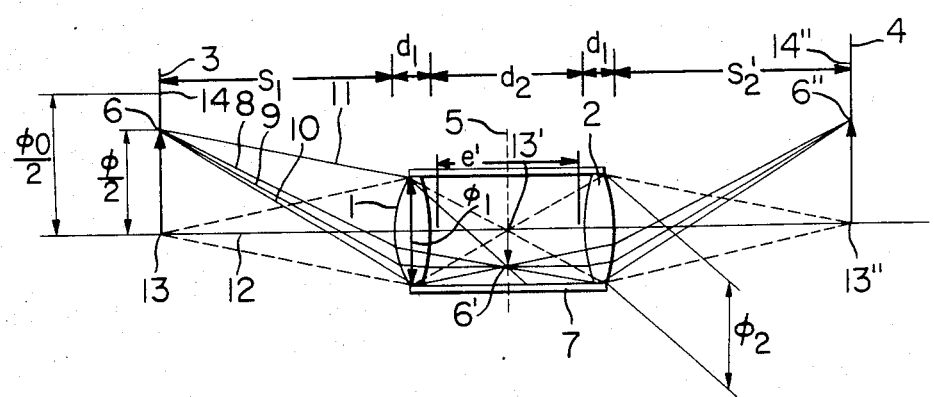
FIG. 1 illustrates an element lens system which is a unit imaging system forming the compound eye projection device of the present invention.

FIG. 1 shows an element lens system constituting the device of the present invention. In FIG. 1, the light beams 8, 9, 10 from the object point 6 off the optical axis on an object surface 3 are converged onto the intermediate image point 6' of the intermediate imaging plane 5 by a lens 1, whereafter they become divergent light beams and travel toward a lens 2. The lens 1 and the lens 2 have entirely the same shape and entirely the same power. Of the light beams from the object point 6, the light beam between those designated by 8 and 10 passes through the lens 2 and is imaged at the image point 6" on the image plane 4. The final image point 6" is a conjugate point of the object point 6 and an erect one-to-one magnification image. Of the light beams from the object point 6, the central ray 9 of the light beam in the range designated by 8 and 10 becomes parallel to the optical axis and crosses the intermediate imaging plane 5 because the lens system is a telecentric system if it is a system in which the effective diameters of the lenses 1 and 2 are equal.

Next, of the light beams (not shown) from the object point 6, the light beam in the range designated by 8 and 11, when it becomes divergent from the intermediate image point 6', impinges on a light-absorbing member 7 and is absorbed thereby and is not converged onto the final image point 6". That is, the light-absorbing member 7 causes the light rays exceeding the effective diameter of the lens to disappear.

Of the light beams incident on the lens 1 from the object point 6, the light beam which contributes to the imaging onto the final image point 6" is that within a solid angle in the range designated by 8 and 10. The absolute value of this light beam which contributes to the imaging becomes smaller from the on-axis portion toward the off-axis portion and becomes zero at a maximum view field portion 14. The solid angle of the light beam which contributes to the imaging is maximum at the object point 13 on the optical axis 12 and the magnitude thereof is that at which the pupil of the lens 1 subtends the object point 13 and thus, the eclipse by the light-absorbing member 7 becomes zero.

Figure 2:
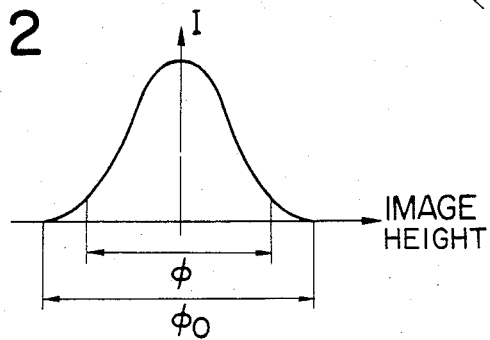
FIG. 2 shows the light intensity distribution in the element lens system.

Thus, as shown in FIG. 2, the light intensity distribution on the final image plane of the element lens system assumes a Gauss distribution form in which the intensity is maximum on the optical axis and becomes reduced by aperture eclipse off-axis. In FIG. 2, the vertical axis I represents the intensity of light and the horizontal axis corresponds to the image height, namely, the distance from the optical axis.

Figure 3A:
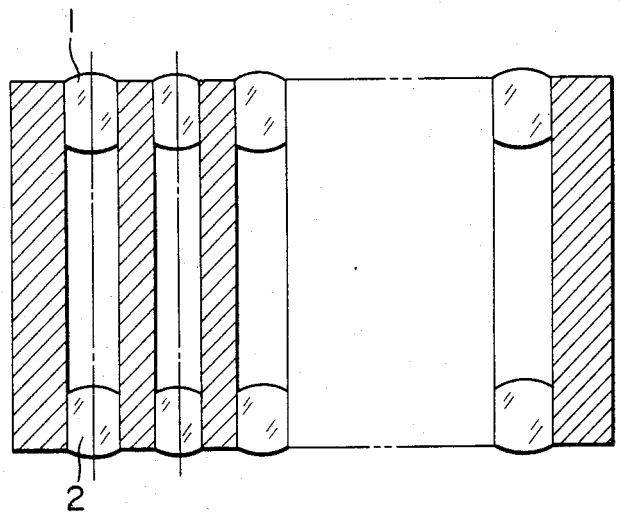
FIGS. 3A and 3B are cross-sectional views of the compound eye projection device taken in the array direction.
Figure 3B:
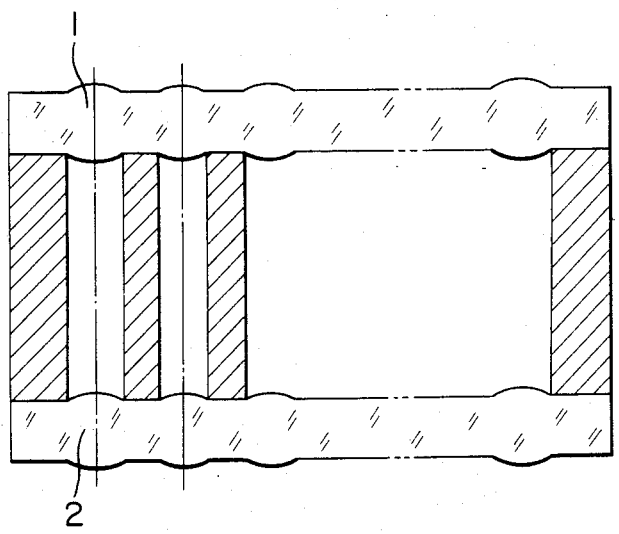

FIGS. 3A and 3B are cross-sectional views of different embodiments taken in the array direction.

Respective element lens systems are arranged in a line form and parallel to each other at equal intervals in a predetermined direction in a plane perpendicular to the optical axis.

In FIG. 3A, a one-piece holding member is formed with a plurality of through-holes corresponding to respective element lens systems and the lenses 1 and 2 are inserted therein and the respective element lens systems are separated from one another.

Figure 4:
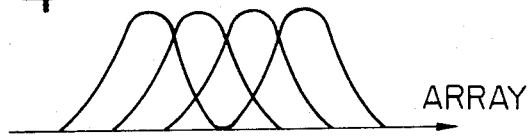
FIG. 4 illustrates the superposed light intensity distribution on the image plane.

In FIG. 3B, the lenses 1 and 2 each are formed integrally in a sheet-like form. In this case, masks having a plurality of circular openings may be provided in the optical path immediately before the lens 1 and immediately behind the lens 2 to intercept the incident light from the other portion of the sheet than the lens portion. If the element lens systems are so arranged at equal intervals in a plane perpendicular to the optical axis, the final light intensity distribution on the image plane will become one having the light intensity distribution of a predetermined element lens system superposed thereon as shown in FIG. 4.

When a row of the array is considered, in order that the light intensity distribution in the vicinity of a line passing through the optical axes of the element lens systems may be uniform over the array direction, the inventor has given numerical data of lenses and array intervals as will hereinafter be described.

Thus, where a plurality of rows are used, the light intensity distribution in the vicinity of the intermediate portions of adjacent rows becomes uniform in the array direction.

Now, the numerical data of lenses and array intervals in the present invention will hereinafter be described.

Consider on the assumption that the refractive powers of the lenses 1 and 2 are $\varphi_1$ and $\varphi_2$, respectively, the effective diameters of the lenses 1 and 2 are $\phi_1$ and $\phi_2$, respectively, the principal point interval between the lens 1 and the lens 2 is e', the distance between the lens 1 and the object surface is $S_1$, the maximum diameter of the effective object view field is $\phi_0$, the distance between the lens 2 and the final image plane is $S_2'$, and the object side F-value is Fe. Fe, $S_1$ and $\phi_0$ can be present, and the necessary numerical data of the optical system are determined by these set amounts and the paraxial imaging theory.

First, from the definition of F-value, $$Fe = \frac{\sqrt{S_1^2 + \left(\frac{\phi_1}{2}\right)^2}}{\phi_1} \tag{1}$$

Next, the following equation is obtained from the paraxial imaging theory in an erect one-to-one magnification system:

$$\alpha_1 e' + \varphi_1 e' = 2 \tag{2}$$

where $\alpha_1$ is the converted inclination on the object side (the angle formed between the ray incident from the on-axis object point onto the first surface of the lens and the optical axis, multiplied by the refractive index on the object side), and with the workability taken into account, it is to be understood that the refractive powers of the lenses 1 and 2 are equal.

Now, the following equation is obtained from the condition on which the vignetting of lens becomes zero at a maximum angle of view:

$$\frac{1}{S_1}\left(\frac{\phi_0}{2} - \frac{\phi_1}{2}\right) \times \frac{1}{\frac{\phi_1}{2}} = \varphi_1 \tag{3}$$

where $\phi_0 > 0$ and $\phi_1 < 0$.

From equations (1), (2) and (3), $\phi_1$, e' and the common radii of curvature r and $-r$ of the lenses 1 and 2 are obtained.

$$\phi_1 = \frac{-S_1/Fe}{\sqrt{1 - \left(\frac{1}{2Fe}\right)^2}} \tag{4}$$

$$e' = 2S_1 \times \phi_1/\phi_0 \tag{5}$$

If the common thickness of the lenses 1 and 2 is d and the refractive index of the lenses is n, $$\varphi_1 = (n-1) \times \frac{2}{r} - \frac{d}{r^2} \times \frac{(n-1)^2}{n}$$

From this and equation (3), $$r = \frac{(n-1) + \left[(n-1)^2 - \frac{1}{S_1} \times \left(\frac{\phi_0}{\phi_1} - 1\right) \times d \times \frac{(n-1)^2}{n}\right]^{\frac{1}{2}}}{\frac{1}{S_1}\left(\frac{\phi_0}{\phi_1} - 1\right)} \tag{6}$$

At this time, the interval P in the array direction of the element lens system is set so as to satisfy the following formula:

$$0.36\phi_0 < P < 0.44\phi_0 \tag{7}$$

Now, $\phi_1$, e', r and $-r$ are determined by the equations (4), (5) and (6) above, but even if there is an error of ±20%, the uniformity of the light intensity distribution in the array direction in the vicinity of the center of the imaging plane is kept within several percent in designing. That is, there is a tolerance of 0.8 times to 1.2 times the absolute value given by the above equation. Examples of numerical values will now be shown.

When the principal point interval between the lens 1 and the lens 2 is e', the thickness of each lens is represented by $d_1$, the effective lens diameters $\phi_1$, $\phi_2$ are the same and the interval between the opposed surfaces of the lenses 1 and 2 is represented by $d_2$. $r_1$ and $r_2$ are the radii of curvature of the object side surface and the image side surface, respectively, of the lens 1, and $r_3$ and $r_4$ are the radii of curvature of the object side surface and the image side surface, respectively, of the lens 2. While the absolute value of the radii $r_1$, $r_2$, $r_3$ and $r_4$ are the same, they are indicated in positive value when the surfaces lie adjacent to the object side with respect to the center of curvature, and in negative value when the surfaces lie adjacent to the image side with respect to the center of curvature.

The array interval P is in the range of $0.36\phi_0 < P < 0.44\phi_0$.

For numerical value examples No. 1 to No. 10, lenses formed of acryl are used and for numerical value examples No. 11 to No. 15, lenses formed of optical glass are used.

| Lens No. | Material | n | $r_1 = -r_2$ $r_3 = -r_4$ | $S_1$ | $d_1$ | $d_2$ | $\phi_0$ | $\phi_1$ |
|---|---|---|---|---|---|---|---|---|
| | | | | Numerical Value Examples Unit: mm | | | | |
| 1 | Acryl | 1.491 | 2.6 | −13.0 | 2.5 | 6.0 | 4.5 | 1.3 |
| 2 | Acryl | 1.491 | 2.6 | −12.4 | 2.5 | 6.0 | 4.2 | 1.3 |
| 3 | Acryl | 1.491 | 2.6 | −11.0 | 2.5 | 6.0 | 3.9 | 1.3 |
| 4 | Acryl | 1.491 | 2.6 | −14.0 | 2.5 | 6.0 | 4.6 | 1.3 |
| 5 | Acryl | 1.491 | 2.6 | −12.4 | 1.5 | 6.0 | 4.0 | 1.3 |
| 6 | Acryl | 1.491 | 2.6 | −12.4 | 3.5 | 6.0 | 4.4 | 1.3 |
| 7 | Acryl | 1.491 | 2.6 | −12.4 | 2.5 | 5.0 | 4.5 | 1.3 |

-continued

Numerical Value Examples

| Lens No. | Material | n | $r_1 = -r_2$ $r_3 = -r_4$ | $S_1$ | $d_1$ | $d_2$ | $\phi_0$ | $\phi_1$ |
|---|---|---|---|---|---|---|---|---|
| 8 | Acryl | 1.491 | 2.6 | −12.4 | 2.5 | 7.0 | 4.0 | 1.3 |
| 9 | Acryl | 1.491 | 2.6 | −12.4 | 2.5 | 6.0 | 3.6 | 1.1 |
| 10 | Acryl | 1.491 | 2.6 | −12.4 | 2.5 | 6.0 | 4.8 | 1.5 |
| 11 | BK7 | 1.51633 | 2.43 | −12.3 | 2.5 | 5.4 | 4.3 | 1.3 |
| 12 | SK5 | 1.59143 | 2.82 | −12.3 | 2.5 | 5.4 | 4.3 | 1.3 |
| 13 | LaK6 | 1.64512 | 2.97 | −12.3 | 2.5 | 5.1 | 4.5 | 1.3 |
| 14 | LaK10 | 1.72341 | 3.51 | −12.3 | 2.5 | 5.4 | 4.3 | 1.3 |
| 15 | LaSFO3 | 1.81077 | 3.98 | −12.3 | 2.5 | 5.4 | 4.3 | 1.3 |

Unit: mm

Figure 5:
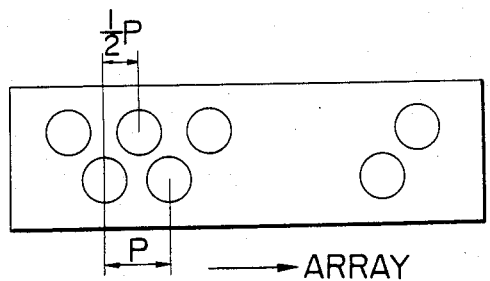
FIG. 5 shows element lens systems arranged in a so-called staggered fashion.

Description has hitherto been made with respect to a case where a plurality of element lens systems are arranged in a line form at equal intervals, but if, as shown in FIG. 5, the element lens systems are arranged in two or more rows and moreover in a so-called staggered array in which the element lens systems of adjacent rows are displaced from each other by ½ of the array interval P, the uniformity of the light intensity distribution in the array direction will be improved.

The above-described compound eye projection device can be applied not only as a slit exposure system used in a known copying apparatus or the like, but also as a compact long-footage sensor reading system.

Figure 6:
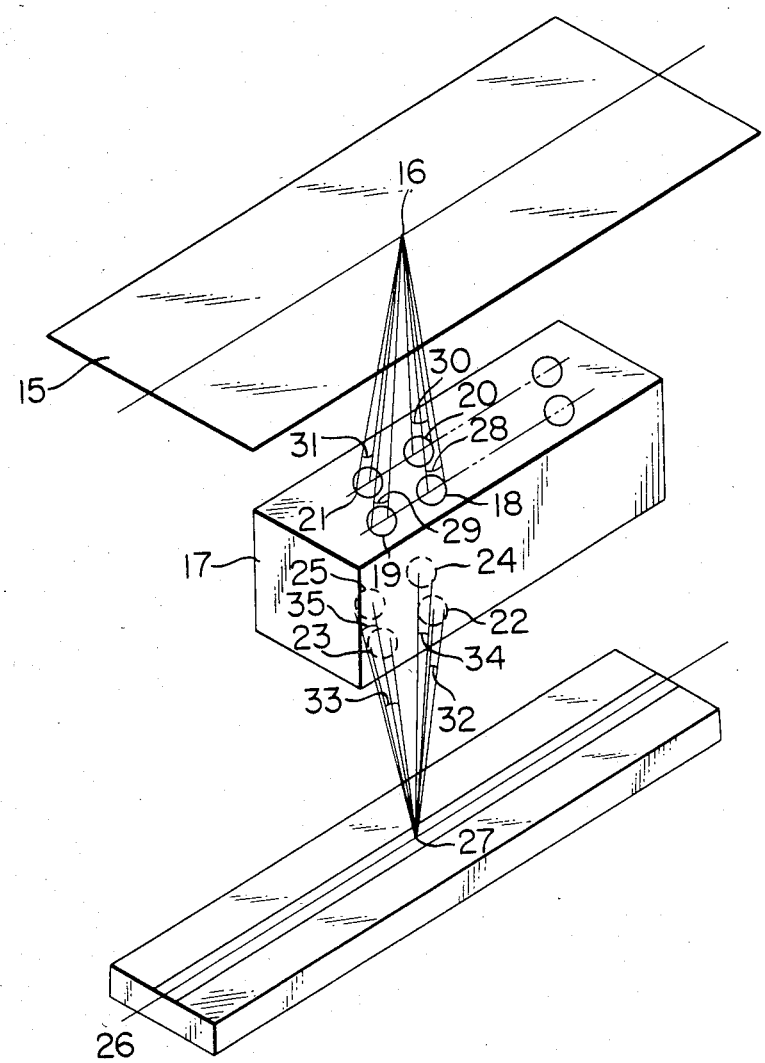
FIG. 6 shows the present invention as applied to a reading system combined with a long-footage sensor.

FIG. 6 shows an example in which the present compound eye optical system has been applied to a reading system coupled to a long-footage sensor.

In FIG. 6, reference numeral 15 designates an original, reference numeral 17 denotes the compound eye optical system, and reference numeral 26 designates a sensor. The light beams from a point 16 on the original 15 travel as light beams 28, 29, 30 and 31 toward lenses 18, 19, 20 and 21, respectively, and they are converged as light beams 32, 33, 34 and 35 from lenses 22, 23, 24 and 25 onto the imaging point 27 of the sensor 26.

Thus, according to the present invention, there can be provided a compact compound eye projection device in which the light intensity distribution in a line form is uniform.

What we claim is:

1. A compound eye projection device comprising:
a plurality of element lens systems, each element lens system consisting essentially of first and second lenses of identical shape arranged along a common optical axis, said plurality of element lens systems being arranged in at least one row such that the optical axes of said plural element lens systems are substantially parallel, said element lens systems satisfying the following conditions:

$$0.8r < r_1 = -r_2 < 1.2r$$

$$r = \frac{(n-1) + \left[ (n-1)^2 - \frac{1}{S_1} \times \left( \frac{\phi_0}{\phi_1} - 1 \right) \times d \times \frac{(n-1)^2}{n} \right]^{\frac{1}{2}}}{\frac{1}{S_1} \left( \frac{\phi_0}{\phi_1} - 1 \right)}$$

$$0.8 \times 2S_1 \times \frac{\phi_1}{\phi_0} < e' < 1.2 \times 2S_1 \times \frac{\phi_1}{\phi_0}$$

$$0.36\phi_0 < P < 0.44\phi_0$$

where $r_1$ and $r_2$ are the radii of curvature of the object side surface and the image side surface of the lenses constituting said element lens systems, n is the refractive index of each lens, d is the on-axis thickness of each lens, $\phi_1$ is the effective diameter of each lens, e' is the principal point interval between each first lens and associated second lens, $\phi_0$ is the maximum diameter of the effective object view field, $S_1$ is the distance from the object side surface of each first lens to an object, and P is the interval between the element lens systems in the row direction.

2. A compound eye projection device according to claim 1, wherein said element lens system are arranged in a staggered fashion in a plurality of rows.

3. An apparatus for reading information of a scanned surface in line form, said apparatus comprising:
a compound eye optical system formed by a plurality of element lens systems arranged in at least one row, each element lens system consisting essentially of two lenses of equal shape and power and disposed with a predetermined distance therebetween along a common optical axis; and
a sensor for reading the line image of the scanned surface formed by said compound eye optical system;
said compound eye optical system satisfying the following conditions:

$$0.8r < r_1 = -r_2 < 1.2r$$

$$r = \frac{(n-1) + \left[ (n-1)^2 - \frac{1}{S_1} \times \left( \frac{\phi_0}{\phi_1} - 1 \right) \times d \times \frac{(n-1)^2}{n} \right]^{\frac{1}{2}}}{\frac{1}{S_1} \left( \frac{\phi_0}{\phi_1} - 1 \right)}$$

$$0.8 \times 2S_1 \times \frac{\phi_0}{\phi_1} < e' < 1.2 \times 2S_1 \times \frac{\phi_1}{\phi_0}$$

$$0.36\phi_0 < P < 0.44\phi_0$$

where $r_1$ and $r_2$ are the radii of curvature of the object side surface and the image side surface of said lenses, n is the refractive index of the said lenses, d is the on-axis thickness of said lenses, $\phi_1$ is the effective diameter of said lenses, e' is the principal point interval between the lenses of each lens system, $\phi_0$ is the maximum diameter of the effective object view field, $S_1$ is the distance between the scanned surface and the lenses which are adjacent to the scanned surface, and P is the interval between the element lens systems in the row direction.

* * * * *

UNITED STATES PATENT AND TRADEMARK OFFICE
CERTIFICATE OF CORRECTION

PATENT NO.  : 4,512,641
DATED       : April 23, 1985
INVENTOR(S) : NORITAKA MOCHIZUKI, ET AL.

It is certified that error appears in the above-identified patent and that said Letters Patent is hereby corrected as shown below:

COLUMN 4

Line 24, "system" should read --systems--.

COLUMN 6

Line 25, "system" should read --systems--.

Signed and Sealed this

Seventeenth Day of February, 1987

Attest:

DONALD J. QUIGG

Attesting Officer

Commissioner of Patents and Trademarks